July 31, 1928. 1,678,787
W. L. REMICK
LEACHING APPARATUS
Filed Sept. 17, 1925 2 Sheets-Sheet 1

Inventor:
Walter L. Remick
By Ogle R. Singleton
Attorney

July 31, 1928.  1,678,787
W. L. REMICK
LEACHING APPARATUS
Filed Sept. 17, 1925  2 Sheets-Sheet 2
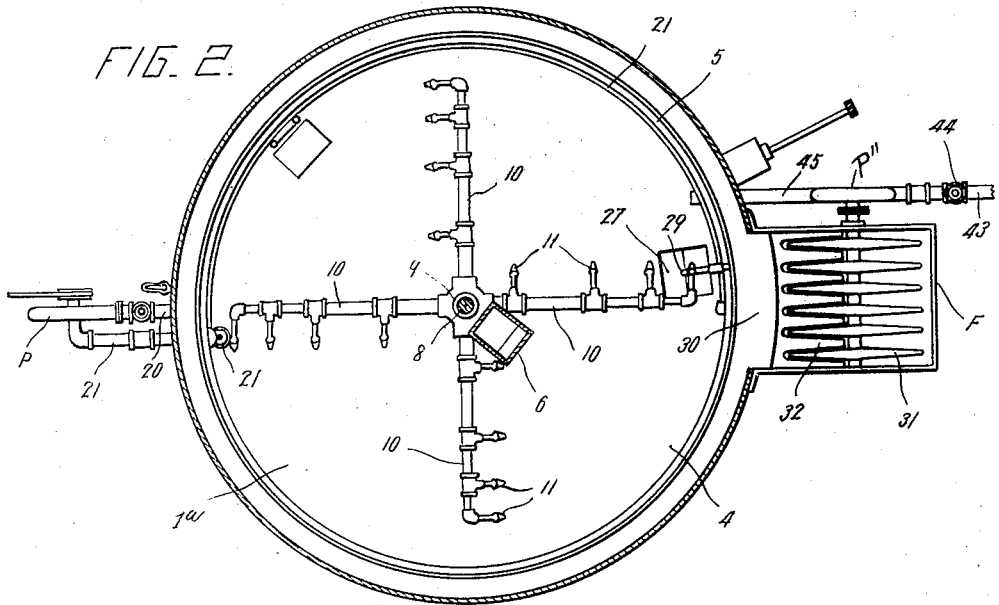
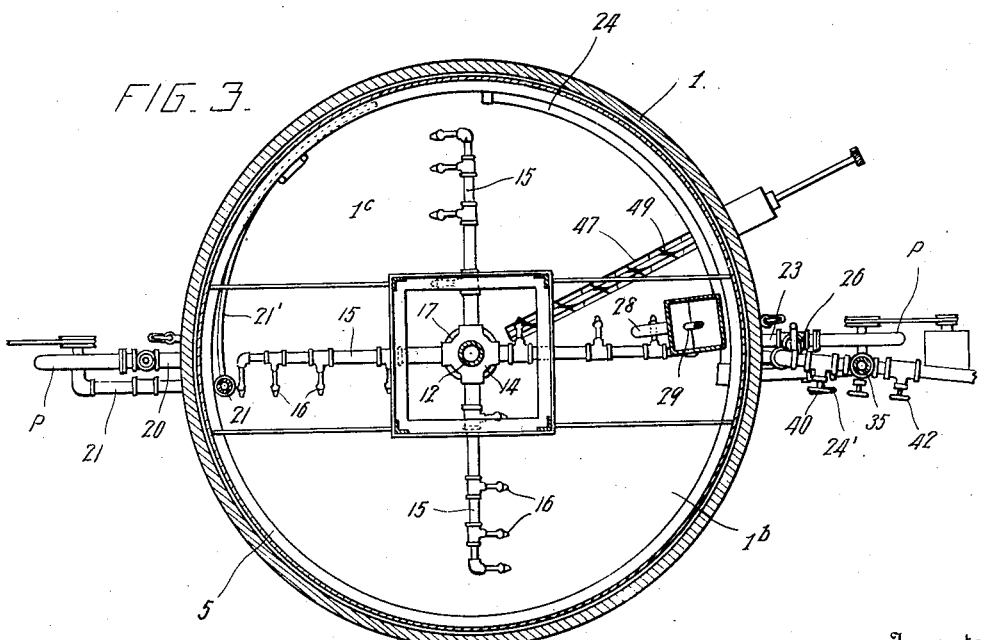
Inventor
Walter L. Remick
By Ogle R. Singleton
Attorney Patented July 31, 1928.

1,678,787

UNITED STATES PATENT OFFICE.

WALTER L. REMICK, OF PHILADELPHIA, PENNSYLVANIA.

LEACHING APPARATUS.

Application filed September 17, 1925. Serial No. 56,916.

My invention consists in a new and useful improvement in apparatus for the removal of soluble constituents of finely divided solids. It is particularly designed for the treatment of the ore, caliche, for the extraction of the sodium nitrate therefrom.

The particularly novel and useful feature of my invention consists in the continuous treatment of the pulverized ore to produce a clear effluent and complete extraction of the sodium nitrate, with consumption of the minimum amount of dissolving solution. This is an extremely important and valuable feature, since by reason of the arid climatic conditions essential to the existence of sodium nitrate in a natural condition the supply of water is obviously extremely limited.

In the drawings filed herewith I have illustrated one specific embodiment of my improved apparatus for the practice of my improved process, but it is to be distinctly understood that I do not consider my invention limited by such illustration but refer for its scope to the claims appended hereto.

In the drawings:

Fig. 2 is a horizontal section on the line 2—2 of Fig. 1.

Fig. 3 is a horizontal section on the line 3—3 of Fig. 1.

Figure 1:
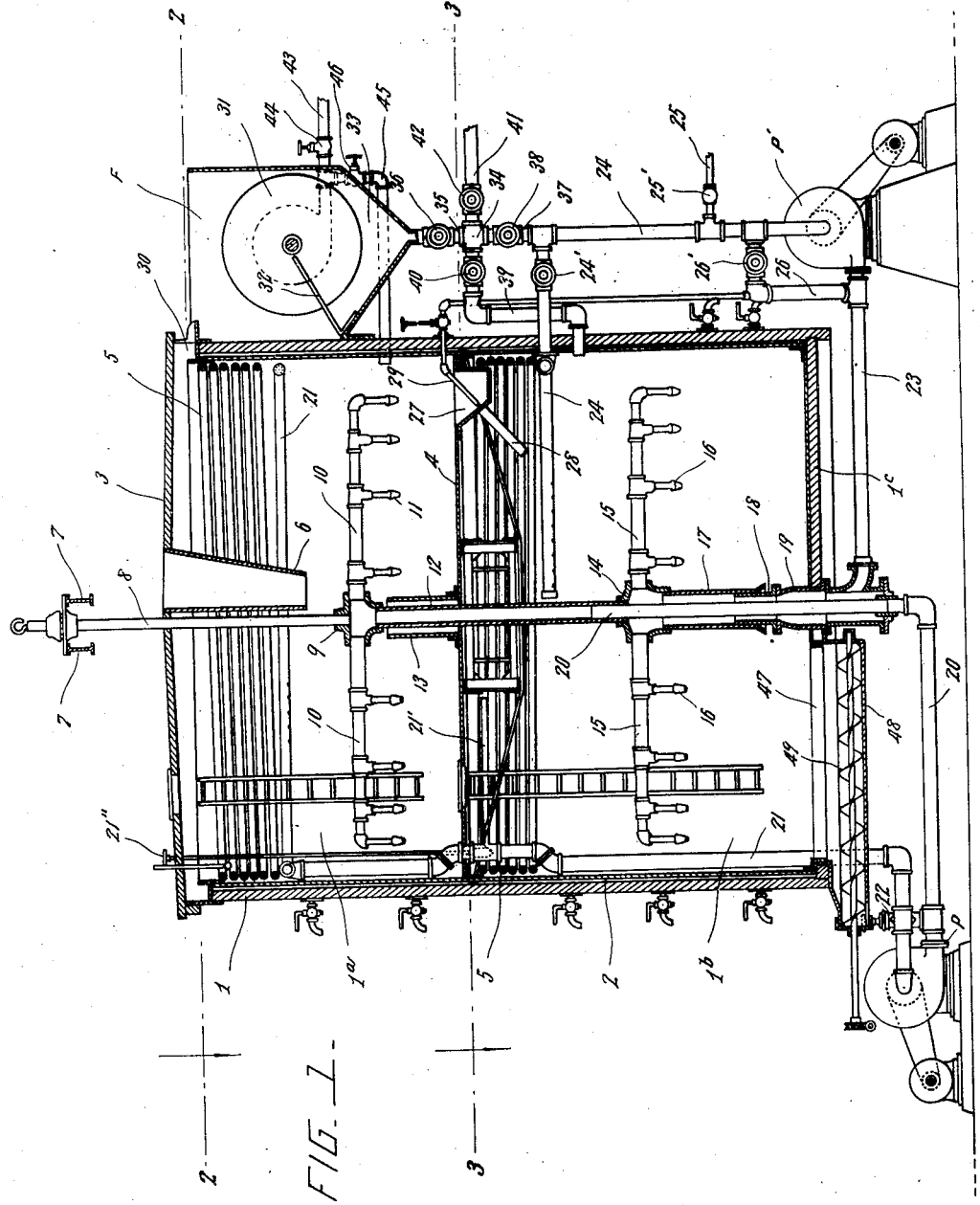
Fig. 1 is a vertical section of my apparatus.

I provide a suitable tank 1 with lining 2 and top 3 and division floor 4 separating the tank 1 into an upper compartment $1^a$ and a lower compartment $1^b$. Each compartment is provided with heater coils 5. Through the top 3 there is provided a tubular feed shell 6. Suitably suspended from the rails 7 there is a rotatable shaft 8 passing centrally through the top 3 and the upper compartment $1^a$ of the tank 1, to which is attached the hollow head 9 from which radiate the pipes 10 provided with a series of tangentially downwardly projected disposed nozzles 11. Attached to the hollow head 9 is the downwardly extending supply pipe 12 passing through the floor 4, extending into the lower compartment $1^b$ of the tank 1. A guard 13 is provided on the floor 4 surrounding the upper part of the pipe 12. Suspended on the lower end of the pipe 12 is the hollow head 14 provided with the radial pipes 15 provided with nozzles 16 disposed similarly to the nozzles 11. From the head 14 a supply pipe 17 depends surrounding nipple 18 which is attached to T 19 opening through the bottom $1^c$ of the tank 1. To one side of the tank 1, I provide a centrifugal pump P, the discharge end of which is connected to a pipe 20 which passes through the T 19, nipple 18 and pipe 17 and head 14 and is connected with head 9 through the pipe 12. Near the upper part of the upper compartment $1^a$ of the tank 1, I provide an intake pipe 21 which passes downwardly through the tank 1, emerging through the bottom $1^c$ and is attached to the intake side of the pump P. An intake pipe 21' with valve 21'', connected with the pipe 21 is located near the upper part of the lower compartment $1^b$ of the tank 1. A by-pass 22 between the pipes 20 and 21 around the pump P is also provided.

I provide a second pump P' from the discharge side of which extends the pipe 23 communicating with the head 14 through the T 19, nipple 18 and pipe 17. Near the upper part of the lower compartment $1^b$ of the tank 1, I provide an intake pipe 24 with valve 24' which is connected to the intake side of the pump P'. To this pipe 24 there is connected a water supply pipe 25 with valve 25'. I provide a by-pass 26 with valve 26' between the pipes 23 and 24 around the pump P'.

In the floor 4 there is provided a sump or discharge pit 27 provided with a discharge tube 28 extending into the lower compartment $1^b$. In the sump 27 there is provided the injector 29 suitably connected through the by-pass 26 with the pipe 23.

The tank 1 is provided at its top with the circumferential launder 30 which discharges into the filter F adjacent the tank 1 and provided with suitable rotatable filter discs 31 and scrapers 32 and hopper 33. Below the hopper 33, I provide a cross 34 connected by pipe 35 with valve 36 to the hopper 33, by pipe 37 with valve 38 to the pipe 24, by pipe 39 with valve 40 to the interior of the compartment $1^b$ at a level slightly above the plane of the pipes 15, and to pipe 41 with valve 42 for discharge. From the suction pump P'' of the filter F there is the discharge pipe 43 with valve 44. The pump P'' is also provided with the pipe 45 with valve 46, which communicates with the interior of the upper compartment $1^a$.

The bottom $1^c$ is provided with a slotted opening 47 communicating with a discharge trough 48 provided with a suitable screw conveyor 49.

This machine is intended primarily for use as a continuous leaching or extracting machine for the removal of soluble constituents of finely divided solids. One of its principal uses, as above pointed out, is the continuous extraction of sodium nitrate from its ore, caliche.

The solid material, containing the soluble constituent, is fed into the machine through the feed shell 6 and settles to the bottom of the upper compartment $1^a$. It is gradually washed by the action of the jets from the nozzles 11 to the point where it enters the sump 27. By this time most of the soluble material is dissolved. The remaining sand (tailings) pass through pipe 28 into the lower compartment $1^b$ and are finally removed from the machine through the screw conveyor 49. Such a device may also be used for removing the sand from the upper compartment into the lower compartment, instead of pipe 28 and jet from pipe 29.

The dissolving solution enters the machine through pipe 25 and valve 25', passes through pump P', pipe 23, T 19 and pipe 17 whence it is distributed through the radial pipes 15 and discharged from the nozzles 16 in a downward and backward direction. The solution is removed from the lower compartment $1^b$ to the upper compartment $1^a$ through the pipe 21', entering the suction pipe 21 of the pump P, thence to the upper pipe compartment $1^a$ through the pump P, pipe 20, arms 10 and nozzles 11. The solution finally overflows into the launder 30 and thence into the filter F.

The arms 10 and 15 are caused to rotate by the force of the jets of liquid from the nozzles. The liquid is taken into the pumps P and P' through intakes 21 and 24 respectively. Pumps P and P' are, therefore, circulating pumps which remove solution from the tops of the compartments $1^a$ and $1^b$, and discharge it against the bottoms, thus causing agitation of the sand in the bottoms and an upward current in the tank 1, as far as the pump intakes 21 and 21'. The bottom compartment $1^b$ acts mainly as a final washing tank to prevent losses of the dissolved material in the waste sand discharged by the screw conveyer 49.

There is in such extraction processes usually an absolute necessity of discharging a perfectly clear solution from the machine. This is due to the subsequent treatment of the solution which precludes the presence of solids in the solution.

The filter F is attached to the extractor as an integral part of my machine. The filter may be operated in such a manner as to dispose of the solid and liquid products in the manner and for the purpose desired. If a cake of low moisture content is desired, the discs 31 may be operated only partially submerged in liquid, and under a vacuum, while the dewatered solid will be discharged outside filter F. If the object be to thicken the solids only and deliver a clear effluent, the discs 31 are submerged and the liquid is drawn through the filtering medium, while the solids are scraped off the revolving discs by the scrapers 32, and settle to the hopper 33 of the filter F, whence they are removed through pipe 35 either being returned to the lower compartment $1^b$ through pipe 24 and pump P' or through pipe 39, or they may be discharged to an outside container through pipe 41. The solution removed by the filter F may be conveyed to another process through pipe 43, or returned to the tank 1 through pipe 45 for re-use in the process.

In the nitrate industry in Chile, the filter F would serve the purpose of clarifying the saturated solution of sodium nitrate, which then passes to crystallizing pans where it is cooled. The sodium nitrate crystallizes out, leaving a "mother liquor" which is returned to the machine to dissolve more sodium nitrate. The steam coils 5 are used to heat the solution to such a degree that the solution, when cooled, will be supersaturated, with the result that the salt will crystallize out.

The machine is particularly designed to save water, which is scarce by virtue of the arid climatic conditions which are essential to the existence of sodium nitrate in a natural condition. If rain occurred, the nitrate would dissolve and disappear. Hence the necessity of conserving water in every possible way. It is with this object in view that provision is made for the return of the filtered solids through pipe 24, pump P' and pipe 23 to the lower compartment $1^b$ where they are washed with the rest of the solids. It will be noted that all fresh, or "make-up" water is introduced through pipe 25 into the lower compartment $1^b$ to wash the waste solids as thoroughly as possible.

Having described my invention, what I claim is:

1. In an apparatus for the removal of soluble constituents of solids, the combination of means for passing the solids through a solution in two successive stages; means for filtering the solution; means for re-introducing the filtered solids into the unfiltered solution at a point at which the solids are passing through said solution in the secondary stage; and means for re-introducing the filtered solution into the unfiltered solution at a point at which the solids are passing through said solution in the primary stage.

2. In an apparatus for the removal of soluble constituents of solids, the combination of a tank having an upper and a lower compartment; a feed shell for solids entering said tank; a supply pipe for a solution entering said tank; an overflow launder; a filter into which said launder discharges; a hopper for the filtered solids; a discharge pipe for the filtered solution; a pipe connecting said hopper with the lower compartment of said tank; and a pipe connecting said filter discharge pipe with the upper compartment of said tank.

3. In an apparatus for the removal of soluble constituents of solids, the combination of a tank divided into an upper and a lower compartment; a supply pipe for filling both compartments with a solution; a system of pipes and pumps for circulating said solution through both compartments; a feed shell for feeding solids to the upper compartment; a sump and injector for transferring said solids from the upper to the lower compartment; a conveyer for discharging said solids from the lower compartment; a discharge pipe for removing a portion of the solution from the upper compartment; a filter for filtering said removed solution; discharge pipes for alternatively discharging the filtered solution or returning it to the upper compartment; and discharge pipes for alternatively discharging the solids recovered from the filtered solution or returning them to the lower compartment.

In testimony whereof I affix my signature.

W. L. REMICK.